(12) United States Patent
Johnson et al.

(10) Patent No.: US 7,422,403 B1
(45) Date of Patent: Sep. 9, 2008

(54) NON-EXPLOSIVE RELEASABLE COUPLING DEVICE

(75) Inventors: A. David Johnson, San Leandro, CA (US); Michael Bokaie, San Rafael, CA (US); Valery Martynov, San Francisco, CA (US)

(73) Assignee: Tini Alloy Company, San Leandro, CA (US)

( * ) Notice: Subject to any disclaimer, the term of this patent is extended or adjusted under 35 U.S.C. 154(b) by 347 days.

(21) Appl. No.: 10/972,745

(22) Filed: Oct. 25, 2004

Related U.S. Application Data

(60) Provisional application No. 60/513,936, filed on Oct. 23, 2003.

(51) Int. Cl.
*F16B 35/00* (2006.01)
(52) U.S. Cl. .................. 411/82.5; 411/DIG. 2; 411/392
(58) Field of Classification Search ............ 411/DIG. 2, 411/82.5, 390, 392, 387, 383
See application file for complete search history.

(56) References Cited

U.S. PATENT DOCUMENTS

| | | | | |
|---|---|---|---|---|
| 1,926,925 A | * | 9/1933 | Wescott | 403/296 |
| 2,060,593 A | * | 11/1936 | Schuarte et al. | 470/11 |
| 2,371,614 A | * | 3/1945 | Graves | 74/579 E |
| 2,608,996 A | | 9/1952 | Forman | |
| 2,610,300 A | | 9/1952 | Walton et al. | |
| 2,647,017 A | | 7/1953 | Coulliette | |
| 2,911,504 A | | 11/1959 | Cohn | |
| 3,229,956 A | | 1/1966 | White | |
| 3,351,463 A | | 11/1967 | Rozner et al. | |
| 3,400,906 A | | 9/1968 | Stocklin | |
| 3,408,890 A | | 11/1968 | Bochman, Jr. | |
| 3,445,086 A | | 5/1969 | Quinn | |
| 3,454,286 A | | 7/1969 | Anderson et al. | |
| 3,546,996 A | | 12/1970 | Grijalva et al. | |
| 3,613,732 A | | 10/1971 | Wilson et al. | |
| 3,620,212 A | | 11/1971 | Fannon, Jr. et al. | |
| 3,659,625 A | | 5/1972 | Coiner et al. | |
| 3,725,835 A | | 4/1973 | Hopkins et al. | |
| 3,849,756 A | | 11/1974 | Hickling | |
| 3,918,443 A | | 11/1975 | Vennard et al. | |
| 3,974,844 A | | 8/1976 | Pimentel | |

(Continued)

FOREIGN PATENT DOCUMENTS

EP    0053596    6/1982

(Continued)

OTHER PUBLICATIONS

US 5,772,989, 06/1998, Fitch et al. (withdrawn).

(Continued)

*Primary Examiner*—Flemming Saether
(74) *Attorney, Agent, or Firm*—Shay Glenn LLP

(57) ABSTRACT

A device and method for holding or clamping components together, and with the clamping being selectively loosened to permit the components to move through a predetermined distance without being fully released. A bolt has its head end attached to one component and its threaded end attached to the other component. A portion of the bolt's shank is formed with a necked-down portion. An actuator of shape memory alloy material is mounted about the bolt. When energized by heat, the actuator expands and exerts a great force which stretches the bolt, permanently deforming the bolt. This enables limited movement of the components while still restraining them from separating.

5 Claims, 1 Drawing Sheet

U.S. PATENT DOCUMENTS

| | | | |
|---|---|---|---|
| 4,055,955 A | | 11/1977 | Johnson |
| 4,063,831 A | * | 12/1977 | Meuret ........................ 403/28 |
| 4,072,159 A | | 2/1978 | Kurosawa |
| 4,096,993 A | | 6/1978 | Behr |
| 4,176,719 A | | 12/1979 | Bray |
| 4,177,327 A | | 12/1979 | Mathews |
| 4,243,963 A | | 1/1981 | Jameel et al. |
| 4,340,049 A | | 7/1982 | Munsch |
| 4,485,545 A | | 12/1984 | Caverly |
| 4,501,058 A | * | 2/1985 | Schutzler ..................... 29/446 |
| 4,524,343 A | | 6/1985 | Morgan et al. |
| 4,549,717 A | | 10/1985 | Dewaegheneire |
| 4,551,974 A | | 11/1985 | Yaeger et al. |
| 4,553,393 A | | 11/1985 | Ruoff |
| 4,558,715 A | | 12/1985 | Walton et al. |
| 4,567,549 A | | 1/1986 | Lemme |
| 4,585,209 A | | 4/1986 | Aine et al. |
| 4,596,483 A | | 6/1986 | Gabriel et al. |
| 4,619,284 A | | 10/1986 | Delarue et al. |
| 4,654,191 A | | 3/1987 | Krieg |
| 4,684,913 A | | 8/1987 | Yaeger |
| 4,706,758 A | | 11/1987 | Johnson |
| 4,753,465 A | | 6/1988 | Dalby |
| 4,821,997 A | | 4/1989 | Zdeblick |
| 4,823,607 A | | 4/1989 | Howe et al. |
| 4,824,073 A | | 4/1989 | Zdeblick |
| 4,848,388 A | | 7/1989 | Waldbusser |
| 4,864,824 A | | 9/1989 | Gabriel et al. |
| 4,893,655 A | | 1/1990 | Anderson |
| 4,943,032 A | | 7/1990 | Zdeblick |
| 5,060,888 A | * | 10/1991 | Vezain et al. ............. 244/173.3 |
| 5,061,914 A | | 10/1991 | Busch et al. |
| 5,069,419 A | | 12/1991 | Jerman |
| 5,072,288 A | | 12/1991 | Busch et al. |
| 5,114,504 A | | 5/1992 | AbuJudom, II et al. |
| 5,116,252 A | | 5/1992 | Hartman |
| 5,119,555 A | * | 6/1992 | Johnson ........................ 29/254 |
| 5,129,753 A | | 7/1992 | Wesley et al. |
| 5,160,233 A | | 11/1992 | McKinnis |
| 5,190,546 A | | 3/1993 | Jervis |
| 5,192,147 A | | 3/1993 | McCloskey |
| 5,211,371 A | | 5/1993 | Coffee |
| 5,218,998 A | | 6/1993 | Bakken et al. |
| 5,245,738 A | | 9/1993 | Johnson |
| 5,309,717 A | | 5/1994 | Minch |
| 5,312,152 A | * | 5/1994 | Woebkenberg et al. ..... 294/86.4 |
| 5,325,880 A | | 7/1994 | Johnson et al. |
| 5,344,117 A | | 9/1994 | Trah et al. |
| 5,364,046 A | | 11/1994 | Dobbs et al. |
| 5,494,113 A | | 2/1996 | Polan |
| 5,543,349 A | | 8/1996 | Kurtz et al. |
| 5,605,543 A | | 2/1997 | Swanson |
| 5,619,177 A | | 4/1997 | Johnson et al. |
| 5,622,225 A | | 4/1997 | Sundholm |
| 5,640,217 A | | 6/1997 | Hautcoeur et al. |
| 5,641,364 A | | 6/1997 | Golberg et al. |
| 5,714,690 A | | 2/1998 | Burns et al. |
| 5,771,742 A | | 6/1998 | Bokaie et al. |
| 5,772,378 A | * | 6/1998 | Keto-Tokoi ................. 411/432 |
| 5,796,152 A | | 8/1998 | Carr et al. |
| 5,819,749 A | | 10/1998 | Lee et al. |
| 5,825,275 A | | 10/1998 | Wuttig et al. |
| 5,837,394 A | | 11/1998 | Schumm, Jr. |
| 5,840,199 A | | 11/1998 | Warren |
| 5,850,837 A | | 12/1998 | Shiroyama et al. |
| 5,867,302 A | | 2/1999 | Fleming |
| 5,903,099 A | | 5/1999 | Johnson et al. |
| 5,930,651 A | | 7/1999 | Terasawa |
| 5,960,812 A | | 10/1999 | Johnson |
| 6,072,617 A | | 6/2000 | Henck |
| 6,073,700 A | | 6/2000 | Tsuji et al. |
| 6,075,239 A | | 6/2000 | Aksyuk et al. |
| 6,084,849 A | | 7/2000 | Durig et al. |
| 6,126,371 A | * | 10/2000 | McCloskey ................. 411/82.5 |
| 6,139,143 A | | 10/2000 | Brune et al. |
| 6,195,478 B1 | | 2/2001 | Fouquet |
| 6,203,715 B1 | | 3/2001 | Kim et al. |
| 6,229,640 B1 | | 5/2001 | Zhang |
| 6,247,493 B1 | | 6/2001 | Henderson |
| 6,277,133 B1 | | 8/2001 | Kanesaka |
| 6,386,507 B2 | | 5/2002 | Dhuler et al. |
| 6,406,605 B1 | | 6/2002 | Moles |
| 6,407,478 B1 | | 6/2002 | Wood et al. |
| 6,410,360 B1 | | 6/2002 | Steenberge |
| 6,451,668 B1 | | 9/2002 | Neumeier et al. |
| 6,454,913 B1 | | 9/2002 | Rasmussen et al. |
| 6,470,108 B1 | | 10/2002 | Johnson |
| 6,524,322 B1 | | 2/2003 | Berreklouw |
| 6,533,905 B2 | | 3/2003 | Johnson et al. |
| 6,537,310 B1 | | 3/2003 | Palmaz et al. |
| 6,582,985 B2 | | 6/2003 | Cabuz et al. |
| 6,592,724 B1 | | 7/2003 | Rasmussen et al. |
| 6,605,111 B2 | | 8/2003 | Bose et al. |
| 6,614,570 B2 | | 9/2003 | Johnson et al. |
| 6,620,634 B2 | | 9/2003 | Johnson et al. |
| 6,624,730 B2 | | 9/2003 | Johnson et al. |
| 6,669,795 B2 | | 12/2003 | Johnson et al. |
| 6,688,828 B1 | * | 2/2004 | Post ........................... 411/383 |
| 6,729,599 B2 | | 5/2004 | Johnson |
| 6,742,761 B2 | | 6/2004 | Johnson et al. |
| 6,746,890 B2 | | 6/2004 | Gupta et al. |
| 6,790,298 B2 | | 9/2004 | Johnson et al. |
| 6,811,910 B2 | | 11/2004 | Tsai et al. |
| 6,920,966 B2 | * | 7/2005 | Buchele et al. ............. 188/300 |
| 6,955,187 B1 | | 10/2005 | Johnson |
| 7,040,323 B1 | | 5/2006 | Menchaca et al. |
| 7,084,726 B2 | | 8/2006 | Gupta et al. |
| 7,270,020 B2 | | 9/2007 | Brhel et al. |
| 2001/0023010 A1 | | 9/2001 | Yamada et al. |
| 2003/0002994 A1 | | 1/2003 | Johnson et al. |
| 2003/0170130 A1 | | 9/2003 | Johnson |
| 2006/0118210 A1 | | 6/2006 | Johnson |
| 2006/0213522 A1 | | 9/2006 | Menchaca et al. |
| 2007/0127740 A1 | | 6/2007 | Johnson et al. |
| 2007/0246233 A1 | | 10/2007 | Johnson |

FOREIGN PATENT DOCUMENTS

| | | |
|---|---|---|
| EP | 1122526 | 8/2001 |
| EP | 1238600 | 9/2002 |
| JP | 59179771 | 10/1984 |
| JP | 07090624 | 4/1995 |
| JP | 10173306 | 6/1998 |
| SU | 1434314 | 10/1988 |
| WO | WO1998/053362 | 11/1998 |
| WO | WO2000/004204 | 1/2000 |
| WO | WO2003/052150 | 6/2003 |
| WO | WO2005/108635 | 11/2005 |

OTHER PUBLICATIONS

Xiaogdang, MA; U.S. Appl. No. 10/972,759 entitled "Magnetic data storage system," filed Oct. 25, 2004.

Johnson, David et al.; U.S. Appl. No. 11/006,501 entitled "Anastomosis device and method," filed Dec. 6, 2004.

Johnson, David et al.; U.S. Appl. No. 11/041,185 entitled "Single crystal shape memory alloy devices and methods," filed Jan. 24, 2005.

Johnson, David; U.S. Appl. No. 11/396,234 entitled "Tear-resistant thin film methods of fabrication," filed Mar. 31, 2006.

Johnson, David; U.S. Appl. No. 11/415,885 entitled "Eyeglass frame," filed May 2, 2006.

Johnson, David; U.S. Appl. No. 11/420,157 entitled "Shape memory allow thin film, method of fabrication, and articles of manufacture," filed May 24, 2006.

Johnson, David; U.S. Appl. No. 11/526,138 entitled "Constant load bolt," filed Sep. 22, 2006.

Johnson, David; U.S. Appl. No. 11/859,697 entitled "Constant load fastener," filed Sep. 21, 2007.

I.E. Viahhi; Robototechnic Constructions Based On CU-AL-NI Single Crystal Actuators: Proceedings of Second International Conference on Shape Memory and Superelastic Technologies; 1997; United States.

Pauling, Linus, College Chemistry, second edition, W.H. Freeman and Company, San Francisco, 1955, pp. 81-91.

Buchaillot L. et al., "Thin film of titanium/nickel shape memory alloy for multi-degree of freedom microactuators", Seisan Kenkyu, vol. 51, No. 8, 1999, pp. 22-23.

Johnson A.D. et al., "Application of shape memory alloys: advantages, disadvantages, and limitations", Micromachining and Microfabrication Process Technology VII, Oct. 22-4, 2001, San Francisco, CA, USA, vol. 4557, 2001, pp. 341-351.

Takabayashi S. et al., "Reversible shape memory alloy film fabricated by RF sputtering", Materials and Manufacturing Processes, vol. 13, No. 2, 1998,pp 275-286.

Martynov V., "TiNi thin films for microactuators and microdevices: sputter deposition and processing techniques", Thermec'2003, International Conference on Processing and Manufacturing of Advanced Materials, Jul. 7-11, 2003, Leganes, Madrid, Spain, Materials Science Forum, vol. 426-432, Jul. 7, 2003, pp. 3475-3480.

Johnson, David et al.; U.S. Appl. No. 11/948,852 entitled "Method of alloying reactive elemental components,"0 filed Nov. 30, 2007.

Johnson, David et al.; U.S. Appl. No. 11/949,663 entitled "Hyperelastic shape setting devices and fabrication methods," filed Dec. 3, 2007.

* cited by examiner

NON-EXPLOSIVE RELEASABLE COUPLING DEVICE

CROSS-REFERENCE TO PRIOR APPLICATION

This application claims the benefit under 35 USC §119(e) of U.S. provisional application Ser. No. 60/513,936 filed Oct. 23, 2003.

BACKGROUND OF THE INVENTION

1) Field of the Invention

This invention relates in general to the remote release of a clamping force, such as to secure payloads in spacecraft during space launch and to then release the payloads for deployment.

2) Description of the Related Art

In space vehicle it is usual to secure payloads during one part of the mission and to separate payload components after a particular phase of the mission is completed. Explosive bolts are typically used to separate stages during launch. Explosive bolts actuate quickly, usually in milliseconds, to achieve simultaneity of release. Other types of separation devices are preferred for releasing payloads or for freeing subsystems such as shutters or photovoltaic arrays after low gravity is achieved. Non explosive release devices, such as disclosed in U.S. Pat. No. 5,119,555 to A. David Johnson et. al., impart less mechanical shock to the system and have advantages of testing subsystems prior to launch so that the same actuator used for testing may be flown on a mission.

A special case is one in which it is not desired to separate the components completely but to change the fastening so that the components can move a limited amount relative to each other while still maintaining a secure mechanical coupling. In this case it is convenient to change the length of one component of the clamping mechanism so that tension is released. The present invention provides a new and safe way of achieving such a release.

OBJECTS OF THE INVENTION

A principal object of the present invention is to provide a new and safe way of achieving release of one or more components of a payload where it is not desired to separate the components completely but to change the fastening so that the components can move a limited amount relative to each other while still maintaining a secure mechanical coupling. Another object is to provide a convenient way to change the length of one component of the clamping mechanism so that tension is relieved.

DETAILED DESCRIPTION OF THE INVENTION

Figure 1:
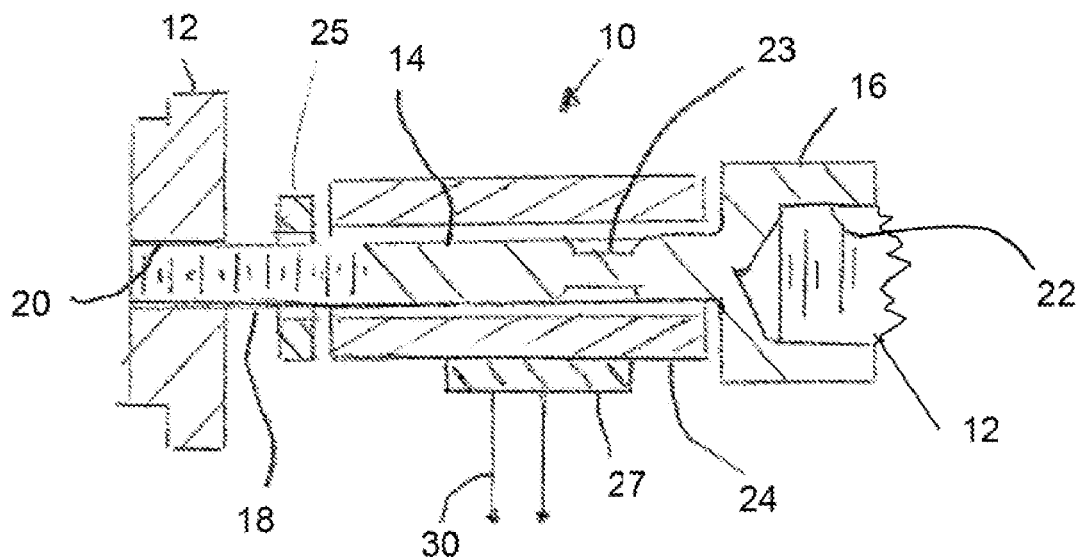
FIG. 1 is a cross sectional view of a coupling device in accordance with one embodiment of the invention.

The present invention improves on the non-explosive bolt separation device and method of U.S. Pat. No. 5,119,555 to A. David Johnson et. al., the disclosure of which is incorporated by this reference. That patent discloses the use of a shape memory alloy (SMA) which, when actuated by heat, elongates and exerts a sufficient force to stretch a segment of a bolt that hold two structures or components together. The SMA continues stretching the bolt beyond its elastic limit, causing the bolt to fail and separate into multiple parts. This separation fully releases the structures or components.

The present invention improves on non-explosive bolts of the type disclosed in the Johnson patent. The device and method of the present invention exerts sufficient force to stretch the bolt to the extent that it is permanently deformed, but the bolt elongation is not enough to cause it to fracture.

Materials have elastic properties. Up to some level of stress, a material yields elastically to stress; that is, when the stress is diminished the strain decreases in proportion to the diminished stress. Above a critical stress, however, the elastic elongation ceases and plastic, non-recoverable strain occurs. In some steels and special alloys this results in a plateau in the material's stress-strain curve. Continued elongation will cause the element to fail by fracture. In the method of the present invention the fastening element is elongated to the plateau but not to the point of fracture.

In the drawings, FIG. 1 shows fastener device 10 of the invention for holding or fastening a component 12, such as a part of a spacecraft payload, to another component (12'). Device 10 comprises a bolt 14 having a head end 16 and externally threaded end 18. The threaded end is screwed into an internally threaded hole 20 formed in component 12. The bolt's head end is formed with an internally threaded dead end hole 22 for fitment with a threaded part of the other component (12') being fastened.

Bolt 14 is formed with at least one necked-down portion 23, as by machining a groove about the bolt's shank. The size of portion 23 is selected so that the bolt stays within the limits, that is, beyond its elastic limit but less than its ultimate tensile limit.

Device 10 further comprises an actuator 24 which is in the form of a cylinder or hollow shell encircling the bolt. The actuator is comprised of an SMA material. The SMA material when in a naive state is annealed into a crystalline state so that it undergoes a crystalline phase transformation from martensite to austenite when subsequently heated through the material's phase change transformation temperature. When below that temperature the material can be plastically deformed from its memory shape in response to a stress. When the deformed SMA material is heated through the transformation temperature, it forcefully reverts by elongating to its memory shape while exerting considerable force. The transformation temperature of the SMA alloy TiNi having equal atomic compositions of the two elements can be made in the range of about 50 to 70° C., and suitable adjustments of the alloy compositions can achieve transformation temperatures ranging from 0° C. to 100° C. During the alloying process, a third metal such as hafnium or palladium can be amalgamated with the Ti and Ni elements to raise the transition temperature, while iron or vanadium can be amalgamated with the Ti and Ni to lower the transition temperature, as required for particular applications.

The length and diameter of bolt are predetermined so that the bolt can sustain the tension of the clamp while remaining in the elastic portion of the bolt's stress-strain curve.

Actuator 24 is heated to its phase change crystalline transformation temperature for operation by suitable means such as an electric heater 27. The heater can have electric resistance coils mounted in close heat transfer relationship about the actuator's outer surface. An external power source (not shown) is connected by a suitable switch (not shown) through wires 30 for directing the current through the actuator. The rate of heating is controlled by use of a suitable controller (not shown), such as a computer, so that actuator takes place within a specified time. When heated to the transformation temperature, the actuator elongates to its memory shape.

A nut 25 threaded on the bolt end 18 is tightened to stretch the bolt. The mechanical strengths of the actuator and necked-down portion of the bolt are matched to each other so that the nut can be tightened, causing the bolt to stretch and the actuator to compress, within their respective elastic limits. Further elongation of the bolt occurs when the load (from the components) is applied to opposite ends of the bolt. This puts the bolt in tensile stress while remaining in the elastic region of the bolt. When electric current is applied through wires 30, the temperature of the resistive heater is gradually raised through the transformation temperature of the actuator, causing it elongate with great force. This force permanently deforms the necked-down portion of the bolt. Component 12 is then loosened, but not fully released, from the other component attached to the head end of the bolt. This permits the two components to move a small distance before encountering resistance, but they still are restrained by the clamp from moving more than the prescribed distance

The invention claimed is:

1. A device for holding a first and a second component together, the device comprising:
   a bolt having a first end configured to secure to a first component, and a second end configured to secure to a second component, the bolt having a shank including a necked-down portion configured to concentrate axial stress;
   a head near the first end;
   a nut mounted about the second end, the second end extending through the nut for securing to the second component;
   an actuator fitted about the shank between the head and the nut, the actuator being formed of a shape memory alloy material that is configured to elongate axially against the head and nut in response to being heated through the material's crystalline phase change transformation temperature;
   wherein the bolt is configured to convert from a compressed configuration to an elongated configuration by heating the actuator and elongating the necked-down portion to plastically deform the bolt.

2. The device of claim 1, wherein the first end comprises threading configured to secure the first component.

3. The device of claim 1, wherein the first end comprises internal threading configured to secure the first component.

4. The device of claim 1, wherein the second end comprises threading configured to secure the second component.

5. The device of claim 1, wherein the second end comprises external threading configured to secure the second component.

* * * * *